US 6,554,099 B2

(12) United States Patent
Uegane

(10) Patent No.: US 6,554,099 B2
(45) Date of Patent: Apr. 29, 2003

(54) EXHAUST MUFFLER

(75) Inventor: Masayuki Uegane, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 99 days.

(21) Appl. No.: 09/795,525

(22) Filed: Mar. 1, 2001

(65) Prior Publication Data

US 2001/0018995 A1 Sep. 6, 2001

(30) Foreign Application Priority Data

Mar. 1, 2000 (JP) ........................................ 2000-056346

(51) Int. Cl.⁷ ................................................. F01N 1/00
(52) U.S. Cl. ........................................ 181/275; 187/237
(58) Field of Search ............................... 181/237, 254, 181/227, 228, 241, 253, 175, 196–198, 200, 203, 204, 264–273, 212–222, 226–229, 233, 277–280

(56) References Cited

U.S. PATENT DOCUMENTS

| 1,747,014 | A | * | 2/1930 | Kersey ........................ 181/212 |
| 2,729,234 | A | * | 1/1956 | Stevenson ................... 137/498 |
| 3,612,214 | A | * | 10/1971 | Blatt et al. .................. 181/237 |
| 3,863,733 | A | * | 2/1975 | Raudman et al. ........... 181/252 |
| 4,161,996 | A | * | 7/1979 | Dolejsi ..................... 137/514.3 |
| 4,484,659 | A | * | 11/1984 | Buchwalder ................ 181/237 |
| 4,903,486 | A | * | 2/1990 | Finkle ........................ 181/236 |
| 5,561,276 | A | * | 10/1996 | Quartarone ................ 181/235 |
| 5,917,161 | A | * | 6/1999 | Fuhrmann ................... 181/237 |
| 6,189,650 | B1 | * | 2/2001 | Inuzuka et al. ............. 181/254 |

FOREIGN PATENT DOCUMENTS

| JP | 08061040 A | * | 3/1996 | ............. F01N/1/08 |
| JP | 8-200039 | | 8/1996 | ............. F01N/1/08 |
| JP | 09068029 A | * | 3/1997 | ............. F01N/1/02 |
| JP | 11013451 A | * | 1/1999 | ............. F01N/1/08 |
| JP | 11022447 A | * | 1/1999 | ............. F01N/1/08 |
| JP | 11036844 A | * | 2/1999 | ............. F01N/1/06 |
| SU | 1477916 A | * | 5/1989 | ............. F01N/1/20 |

* cited by examiner

Primary Examiner—Robert E. Nappi
Assistant Examiner—Patrick Miller
(74) Attorney, Agent, or Firm—Sughrue Mion, PLLC

(57) ABSTRACT

A cap-like valve body is fitted on an outer circumference of an end portion of a communicating pipe that provides a communication between a plurality of silencing chambers formed in a muffler main body. A compressed coil spring is mounted between a flange of the communicating pipe and a flange of the valve body. Communication holes are formed in a cylindrical portion of the valve body. When the valve body receives the pressure of the exhaust gases at a pressure receiving surface and moves along the axial direction against the biasing force of the spring, the exhaust gases within the communicating pipe flow out of the communication holes to the outside of the valve body.

5 Claims, 10 Drawing Sheets

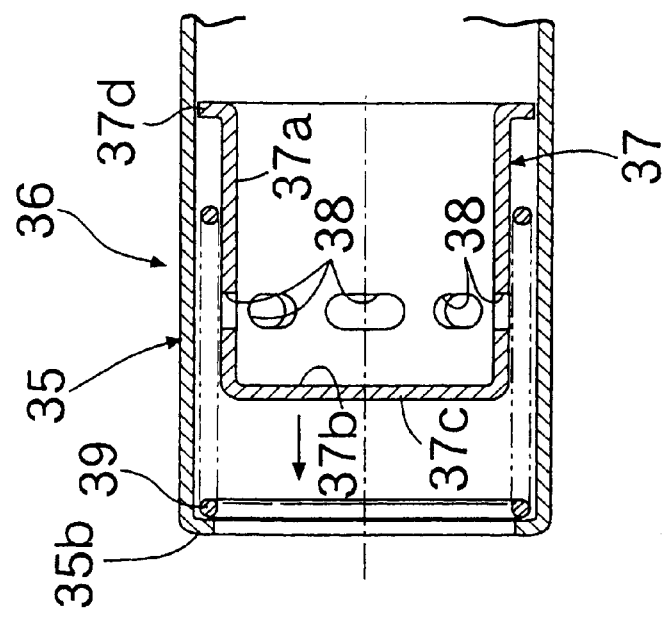
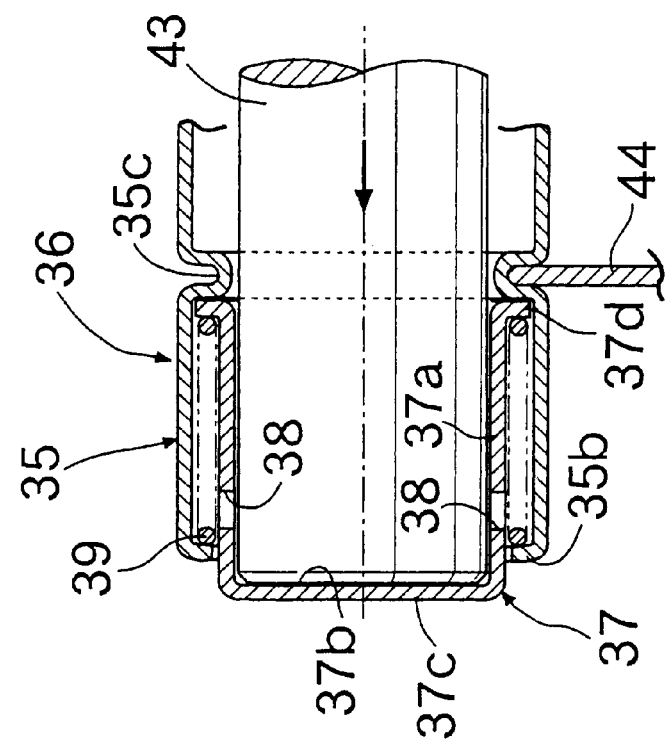

EXHAUST MUFFLER

BACKGROUND OF THE INVENTION

1. Field of the Invention

The present invention relates to an exhaust muffler for an engine, and more particularly to an exhaust muffler in which a control valve for controlling the flow of exhaust gases is provided in a muffler main body, or on an exhaust gas discharge pipe.

2. Description of the Related Art

An exhaust muffler disclosed in JP-A-8-200039 is known as the exhaust muffler described above.

Although the control valve of the aforesaid conventional exhaust muffler is advantageous in that the flow resistance of exhaust gases can be set relatively freely by varying the opening area of a valve body in response to change in the pressure of exhaust gases, the control valve has a problem in that the weight, size and production cost thereof increase are large due to the fact that the control valve includes a number of components such as a valve housing, a rotating shaft, a valve body, a rotationally biasing spring, an axially biasing spring, a case member for forming a spring chamber and a cover.

SUMMARY OF THE INVENTION

The invention was made in view of the aforesaid situations, and an object thereof is to provide a control valve for an exhaust muffler that includes as few components as possible so as to reduce the weight, size and production cost thereof.

With a view to attaining the above and other objects, according to a first aspect of the invention, there is proposed an exhaust muffler comprising a muffler main body, an exhaust gas induction pipe for inducting exhaust gases into the muffler main body, an exhaust gas discharge pipe for discharging the exhaust gases within the muffler main body to the outside, and a control valve provided in the muffler main body or on the exhaust gas discharge pipe for controlling the flow of the exhaust gases. The control valve is constituted by a first tubular body having an exhaust gas inlet opening, at one side thereof, through which exhaust gases flow in an axial direction from the one side to a second, opposite, side of the first tubular body, a second tubular body adapted to axially moveably fit on or in the first tubular body and having a pressure receiving surface for receiving the pressure of exhaust gases flowing thereinto from the exhaust gas inlet opening, wherein the pressure receiving surface is located adjacent to the second end of the first tubular body, and a spring disposed in an annular gap formed between the two tubular bodies, at a portion where the first tubular body fits on or in the second tubular body, for biasing the second tubular body towards the one end in the axial direction. When the second tubular body receives the pressure of the exhaust gases so flowing thereinto at the pressure receiving surface and then moves towards the second end against the biasing force of the spring, the exhaust gases within the first tubular body flow out of communicating holes formed in an outer circumferential surface of the second tubular body to the outside of the second tubular body.

According to the above construction, since the control valve can be constituted by only three members—such as the first tubular body, the second tubular body and the spring—the size, weight and production cost of the control valve can be reduced. Additionally, since the first and second tubular bodies are disposed one inside the other coaxially, the axial dimension of the control valve can be reduced to thereby save and reduce the space required for installation thereof.

According to a second aspect of the invention, there is proposed an exhaust muffler as set forth in the first aspect, wherein the first tubular body is constituted by a communicating pipe for providing a communication between a plurality of silencing chambers formed by partitioning the interior of the muffler main body, or the exhaust gas discharge pipe.

According to the above construction, since the communicating pipe for providing a communication between the plurality of silencing chambers, or the exhaust gas discharge pipe, is used as the first tubular body, the number of components can be reduced to thereby reduce further the size, weight and production cost of the control valve.

According to a third aspect of the invention, there is proposed an exhaust muffler as set forth in the first or second aspect, wherein the spring is constituted by a compression coil spring whose outside diameter is variable relative to an axial direction thereof, whereby the spring is adapted to come into contact with at least one of the first and second tubular bodies at an outer or inner circumferential portion thereof.

According to the above construction, since the spring is constituted by the compression coil spring whose outside diameter is variable relative to the axial direction thereof, whereby the spring is adapted to come into contact with at least one of the first and second tubular bodies at the outer or inner circumferential portions thereof, the resonance phenomenon of the spring can be prevented by virtue of a friction force acting on the contact portion.

Additionally, according to a fourth aspect of the invention, there is proposed an exhaust muffler as set forth in any of the first to third aspects of the invention, wherein as the amount of movement of the second tubular body towards the second end of the first tubular body increases, the opening areas of the communicating holes in the second tubular body increase.

According to the above construction, since the flow rate of the exhaust gases passing through the control valve increases gradually, or in a stepped fashion, as the engine load increases, the target ratio between the exhaust gas noise silencing effect and the engine output reduction suppressing effect can be controlled gradually or in a stepped fashion from a lower engine-loaded state in which priority is given to the improvement in the exhaust gas noise silencing effect, to a higher engine-loaded state in which priority is given to the improvement in the engine output reduction suppressing effect. Therefore, the ratio between the two effects can be automatically varied, as the driver expects, in response to a change in engine load, thereby making it possible to enhance the performance of the exhaust muffler.

Note that: first, second and third silencing chambers 29 to 31 in the embodiments correspond to the silencing chambers of the invention; a second communicating pipe 35 and a sub-exhaust gas discharge pipe 45 in the embodiments correspond to the first tubular body of the invention; a valve body 37 in the embodiments corresponds to the second tubular body of the invention; and a coil spring 39 in the embodiments corresponds to the spring of the invention.

BRIEF DESCRIPTION OF THE DRAWINGS

FIGS. 14A and 4B are diagrams showing an assembling process of the control valve according to the sixth embodiment.

DETAILED DESCRIPTION OF THE PREFERRED EMBODIMENTS

The mode for carrying out the invention will be described below based on embodiments of the invention as illustrated in the accompanying drawings.

Figure 1:
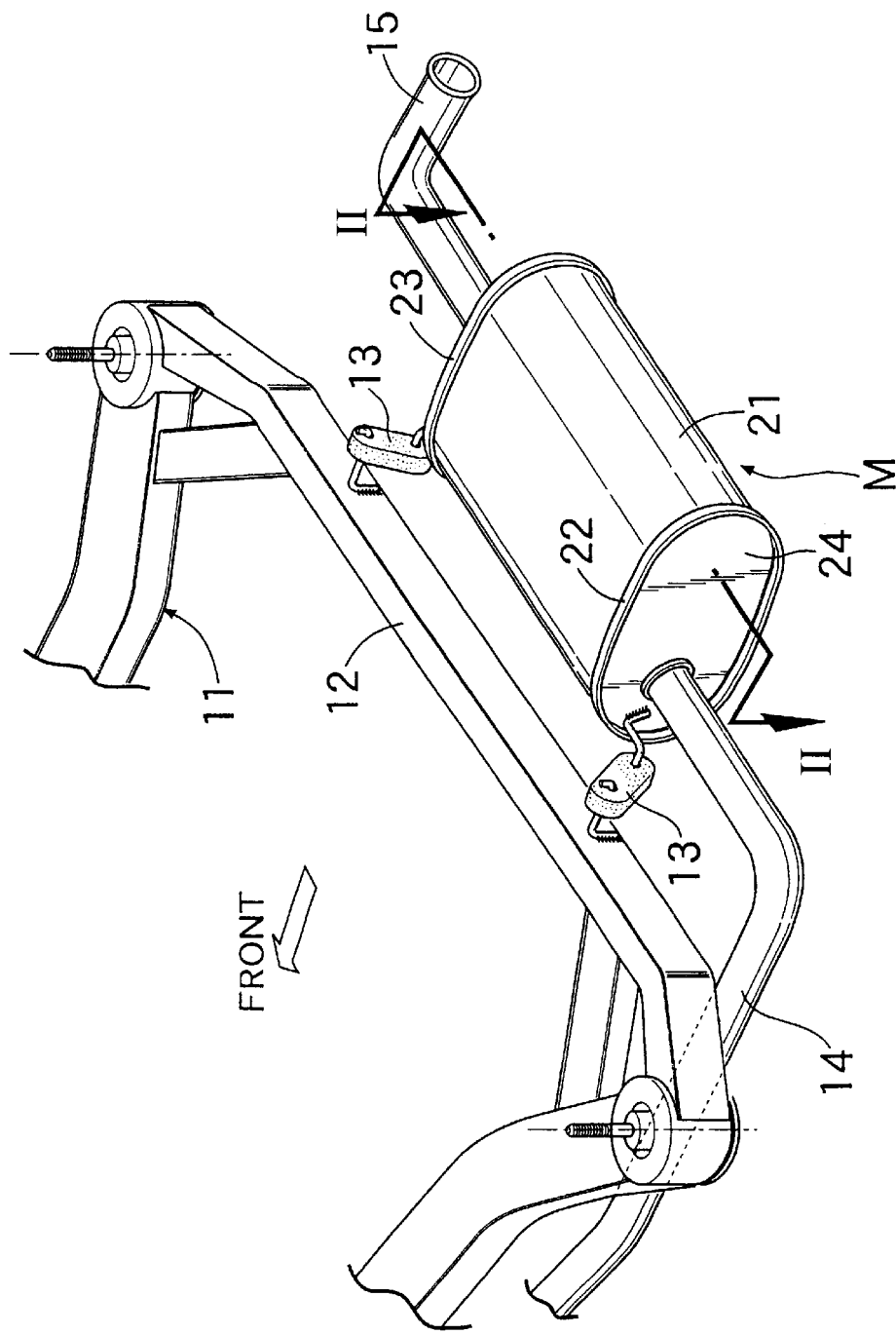
FIG. 1 is a diagram showing a state in which an automotive exhaust muffler is mounted on an automotive vehicle.

FIGS. 1 to 5C show a first embodiment of the invention. As shown in FIG. 1, an exhaust muffler M of the first embodiment is supported, via a pair of elastic members 13, 13, in suspension from a lower surface of a rear cross member 12 of a rear sub-frame 11 provided on a rear part of a body of an automotive vehicle. A front exhaust pipe 14, extending from the exhaust muffler M to the front, is connected to an engine via an exhaust gas purifying device (not shown), whereas a rear exhaust pipe 15, extending from the exhaust muffler M to the rear, is communicated with the atmosphere. Note that this exhaust system is supported in suspension from the underside of the vehicle body via a plurality of other elastic members (not shown), in addition to the pair of elastic members 13, 13 which support the exhaust muffler M in suspension.

Figure 2:
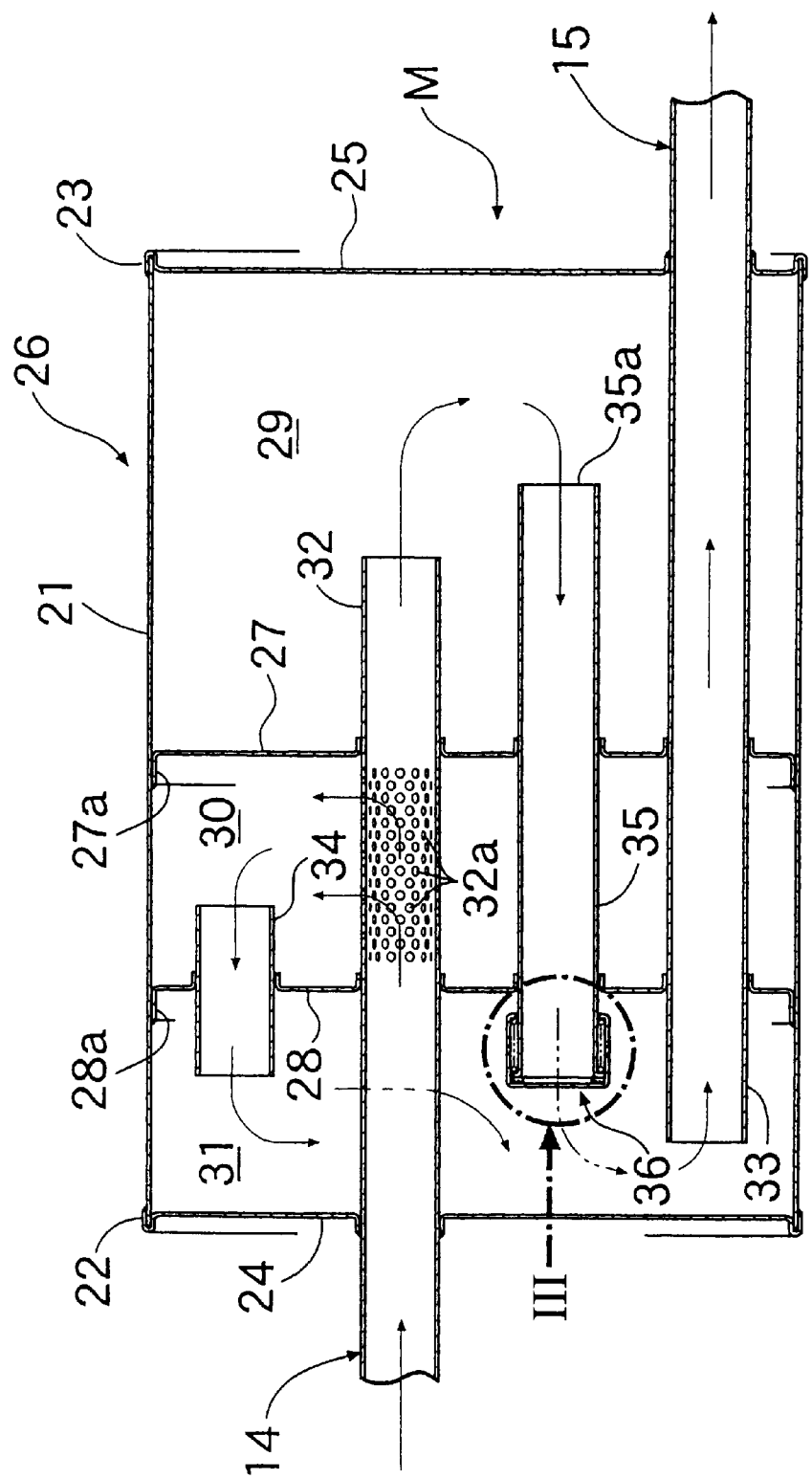
FIG. 2 is an enlarged sectional view taken along the line II—II of FIG. 1.

As shown in FIG. 2, the exhaust muffler M includes a muffler main body 26 constituted by a shell 21 and a pair of end plates 24, 25. The shell 21 has a substantially oval cross section. The pair of end plates 24, 25 is fixed to the shell 21 at crimped portions 22, 23 so as to close openings at left and right ends of the shell 21. The interior of the muffler main body 26 is partitioned into a first silencing chamber 29, a second silencing chamber 30, and a third silencing chamber 31, with a first baffle plate 27 and a second baffle plate 28. The first and second baffle plates 27 and 28 are fixed by press-fitting them to an internal surface of the shell 21 at flanges 27a, 28a thereof which are formed by bending outer circumferential portions of the baffle plates 27 and 28.

A downstream end portion of the front exhaust pipe 14, inserted into the interior of the muffler main body 26, constitutes an exhaust gas induction pipe 32, which passes through the second baffle plate 28 and the first baffle plate 27 so as to open in the first silencing chamber 29. A number of holes 32a ... are punched out of a portion of the exhaust gas induction pipe 32, which portion faces the second silencing chamber 30, for communicating between the interior and exterior of the exhaust gas induction pipe 32. An upstream end portion of the rear exhaust pipe 15, inserted into the interior of the muffler main body 26, constitutes an exhaust gas discharge pipe 33 that passes through the first baffle plate 27 and the second baffle plate 28 so as to open in the third silencing chamber 31. A first communicating pipe 34, which passes through the second baffle plate 28, has ends that are open to the second silencing chamber 30 and the third silencing chamber 31. A second communicating pipe 35, which passes through the first baffle plate 27 and the second baffle plate 28, has ends that are open to the first silencing chamber 29 and the third silencing chamber 31. Then, a control valve 36 of the present embodiment is provided at an end portion of the second communicating pipe 35, which end portion opens to the third silencing chamber 31.

Consequently, a part of the exhaust gases, inducted from the front exhaust pipe 14 into the exhaust gas induction pipe 32 in the interior of the muffler main body 26, flows into the second silencing chamber 30 through the punched-out holes 32a ... formed in the exhaust gas induction pipe 32 and then flows into the third silencing chamber 31 via the first communicating pipe 34, whereas the remaining potion of the exhaust gases, inducted from the front exhaust pipe 14 into the exhaust gas induction pipe 32, flows from the first silencing chamber 29 to the third silencing chamber 31 via the second communicating pipe 35 and the control valve 36. Then, the exhaust gases in the third silencing chamber 31 pass through the exhaust gas discharge pipe 33 to be discharged to the rear exhaust pipe 15 that extends outside the muffler main body 26.

Next, the construction of the control valve 36 will be described with reference to FIGS. 3 and 4.

The control valve 36 includes the end portion of the second communicating pipe 35 that projects into the interior of the third silencing chamber 31, and a valve body 37 which axially moveably fits on an outer circumference of the end portion of the second communicating pipe 35. The second communicating pipe 35 constitutes the first tubular body of the invention, and the valve body 37 constitutes the second tubular body of the invention. The second communicating pipe 35 has an exhaust gas inlet opening 35a (refer to FIG. 2) at the one end portion that faces the first silencing chamber 29, and has a flange 35b that is bent outwardly at the other end portion thereof, which faces the third silencing chamber 31. The valve body 37 includes a cylindrical portion 37a that covers the outer circumference of the other end portion of the second communicating pipe 35. The valve body also includes a bottom wall 37c having a pressure receiving surface 37b that closes the open end of the second communicating pipe 35. The cylindrical portion 37a has a plurality of (eight, in this embodiment) communicating holes 38 ... circumferentially spaced at regular intervals to communicate between the interior and exterior of the cylindrical portion 37a. A gap between an outer circumferential surface of the flange 35b and an inner circumferential surface of the cylindrical portion 37a is set as small as possible so that there is permitted no leakage of exhaust gases therefrom.

A predetermined gap is formed between the outer circumferential surface of the second communicating pipe 35 and an inner circumferential surface of the valve body 37. Ends of a coil spring 39, which is accommodated within this gap in a compressed state, are supported by the flange 35b and a plurality of (four, in this embodiment) flanges 37d . . . inwardly formed at an open end of the valve body 37. Therefore, the valve-body 37 is biased in a rightward direction (a valve closing direction) as viewed in FIG. 3 by virtue of the biasing force of the coil spring 39. An annular shock absorbing member 40 (for example, steel wool) is disposed between the flange 35b and the pressure receiving surface 37b of the bottom wall 37c of the valve body 37. The shock absorbing member 40 prevents striking noise from being generated due to contact between the flange 35b and the valve body 37 when the control valve 36 is in a closed state.

Figure 4:
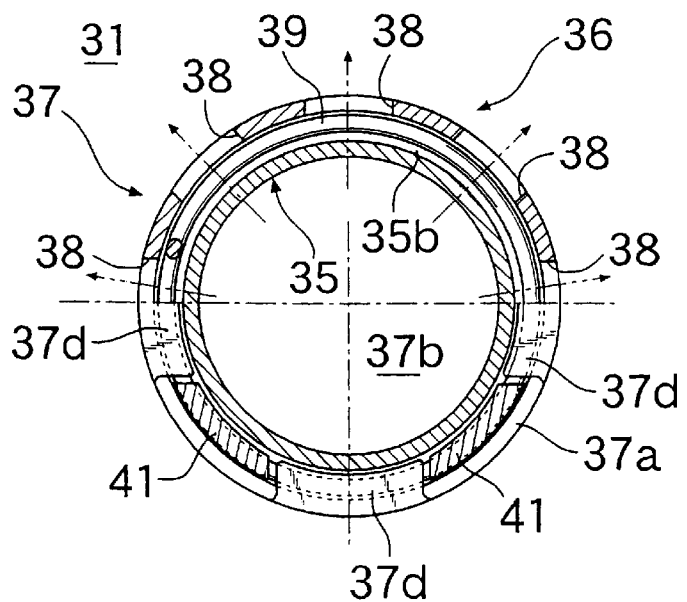
FIG. 4 is a cross-sectional view taken along the line IV—IV of FIG. 3.
Figure 5A:
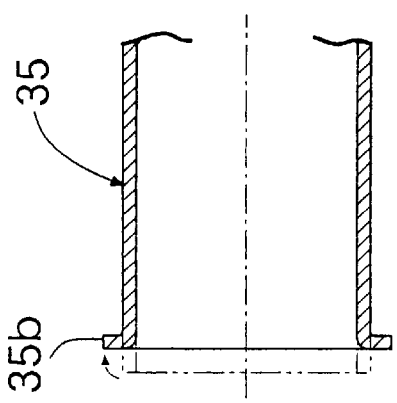
FIGS. 5A to 5C are diagrams showing an assembling process of a control valve.
Figure 5B:
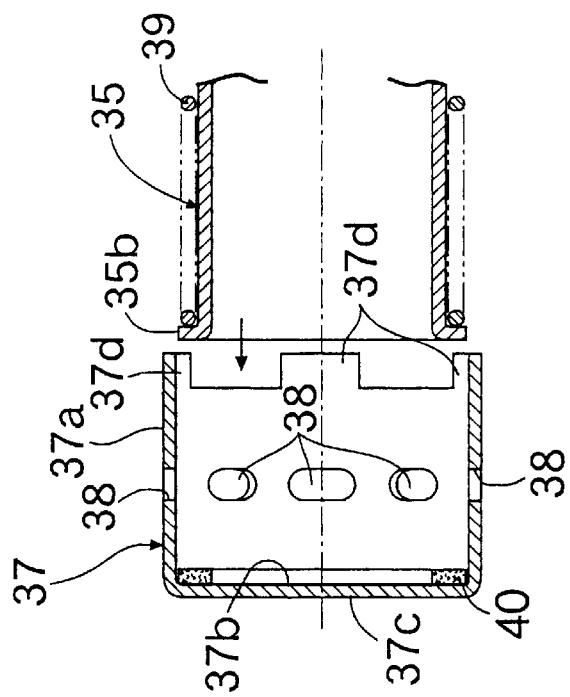
Figure 5C:
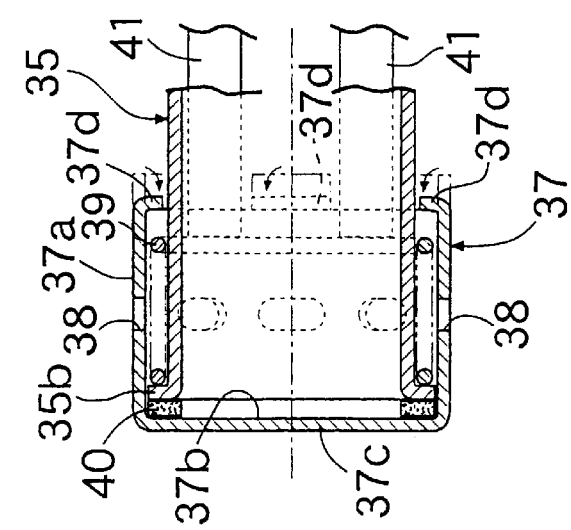

The control valve 36 having the aforesaid construction may be constructed following a procedure illustrated in FIGS. 5A to 5C. Namely, the flange 35b is formed at the end portion of the second communicating pipe 35 in advance (refer to FIG. 5A). Next, with the shock absorbing member 40 being fixed in advance to the pressure receiving surface 37b of the valve body 37, before the four flanges 37d . . . have been crimped, the second communicating pipe 35 with the coil spring 39 supported thereon is inserted into the valve body 37 from the opening thereof (refer to FIG. 5B). Following this, with the flange 35b of the second communicating pipe 35 being pressed against the shock absorbing member 40, the coil spring 39 is compressed with four rod-like jigs 41 . . . inserted from gaps between the four flanges 37d . . . of the valve body 37 and, in this state, the four flanges 37d . . . of the valve body 37 are crimped inwardly. After that, the jigs 41 . . . are withdrawn from the gaps between the flanges 37d . . . for completion of the assembly of the valve body 36. The inserted state of the jigs 41 . . . is also shown in solid lines in FIG. 4.

Figure 3:
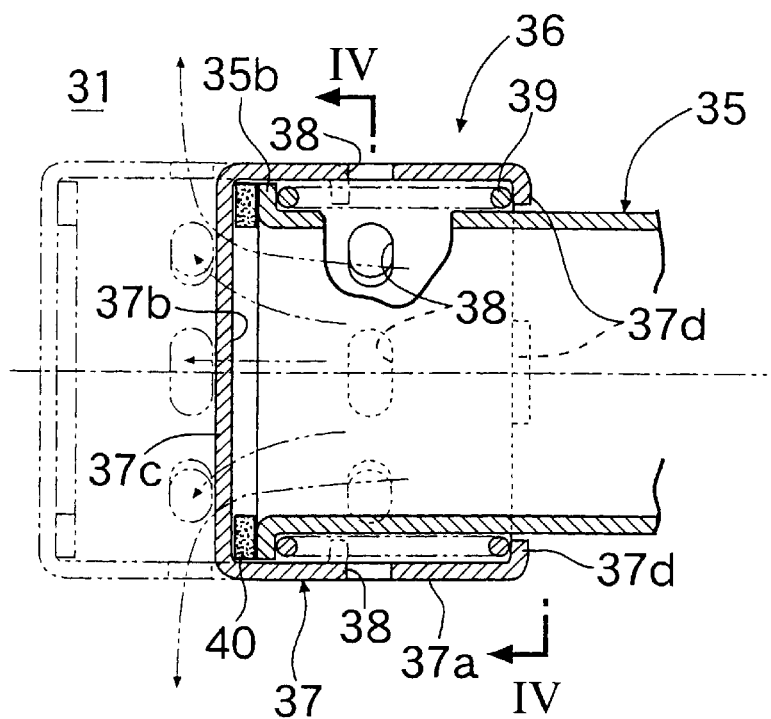
FIG. 3 is a partially enlarged view of a portion designated by reference numeral III shown in FIG. 2.

Thus, in FIG. 2, in a lower engine-loaded state in which the pressure of exhaust gases is low, since the pressure of exhaust gases acting on the pressure receiving surface 37b of the valve body 37 of the control valve 36 from the first silencing chamber 29 via the second communicating pipe 35 is small, the valve body 37 is retained at a valve closing position shown by solid lines in FIG. 3 by virtue of the biasing force of the coil spring 39. When the valve body 37 is in the valve closing position, communication between the first silencing chamber 29 and the third silencing chamber 31 by the second communicating pipe 35 is blocked off. As a result, the exhaust gases from the front exhaust pipe 14 are discharged to the rear exhaust pipe 15 via the punched-out holes 32a . . . in the exhaust gas induction pipe 32, the second silencing chamber 30, the first communicating pipe 34, the third silencing chamber 31 and the exhaust gas discharge pipe 33. Thus, since the valve body 37 is retained at the valve closing position when the engine is running with a lower load, the flow resistance of the exhaust gases within the exhaust muffler M increases, whereby the exhaust gas noise silencing effect is enhanced, thereby making it possible to reduce the exhaust gas noise from the engine.

Then, when the engine operating state changes from the lower engine-loaded state to a higher engine-loaded state, since the pressure of exhaust gases acting on the pressure receiving surface 37b of the valve body 37 of the control valve 36 increases, the valve body 37 moves in a leftward direction as viewed in FIG. 3 against the spring-back force of the coil spring 39. When the communicating holes 38 . . . , formed in the cylindrical portion 37a, move beyond the position of the flange 35b of the second communicating pipe 35, those communicating holes 38 . . . open to the third silencing chamber 31, whereby the first silencing chamber 29 and the third silencing chamber 31 are caused to communicate with each other via the second communicating pipe 35. Additionally, since the amount of movement of the valve body 37, or the opening area of the control valve 36, increases as the pressure of exhaust gases increases, the flow resistance of the exhaust gases within the exhaust muffler M is reduced when the engine is running with a higher load, thereby making it possible to minimize the reduction in engine output.

Additionally, even when the valve body 37 of the control valve 36 is opened and/or closed, the direct collision of the flange 35b of the second communicating pipe 35 with the pressure receiving surface 37b of the valve body 37 is prevented by the provision of the shock absorbing member 40 on the pressure receiving surface 37b of the valve body 37, whereby the generation of noise is prevented. This shock absorbing member 40 is not always needed and, therefore, the member 40 can be omitted.

As has been described heretofore, since the control valve 36 can be constituted by only four components—such as the second communicating pipe 35, the valve body 37, the coil spring 39 and the shock absorbing member 40—and, moreover, since the second communicating pipe 35, which is originally intended to be used for communication between the first silencing chamber 29 and the third silencing chamber 31, is used as part of the control valve 36, the size, weight and production cost of the control valve 36 can be reduced. In particular, since the valve body 37 is adapted to coaxially fit on the outer circumference of the second communicating pipe 35, the axial length of the control valve 36 can be reduced to thereby save and reduce the space required for installation thereof.

Moreover, since the flow rate of exhaust gases passing through the control valve 36 increases as the engine load increases, the target ratio between the exhaust gas noise silencing effect and the engine power output reduction suppressing effect can be automatically varied in response to a change in load of the engine, whereby the exhaust muffler M is allowed to exhibit its optimum performance in response to a change in load of the engine.

Figure 6:
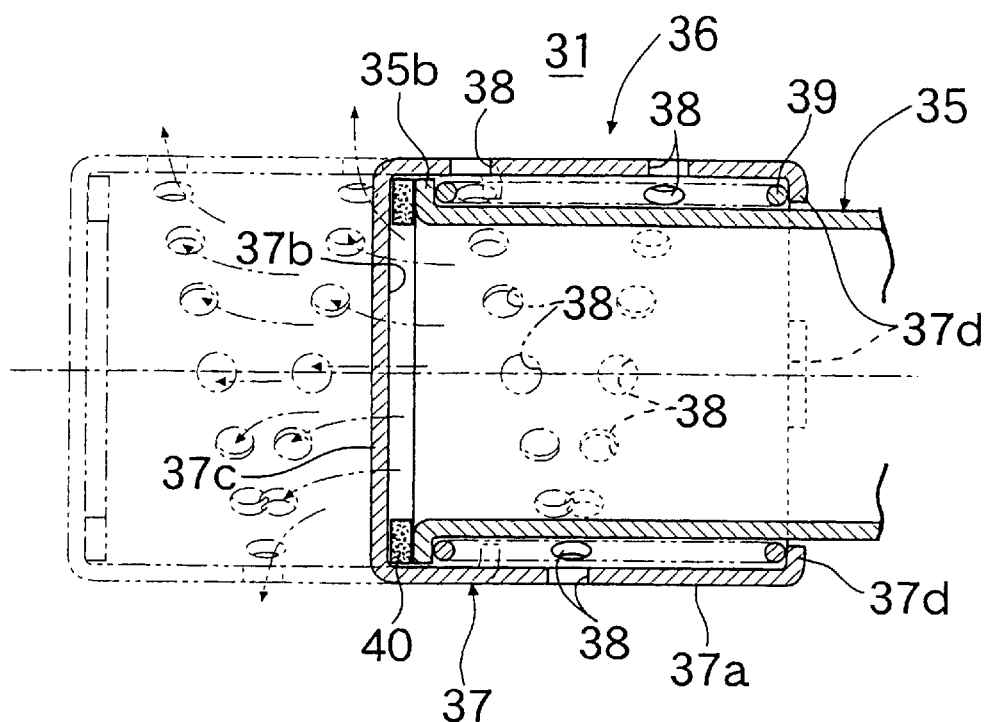
FIG. 6 is a longitudinal sectional view of a control valve according to a second embodiment of the invention.
Figure 7:
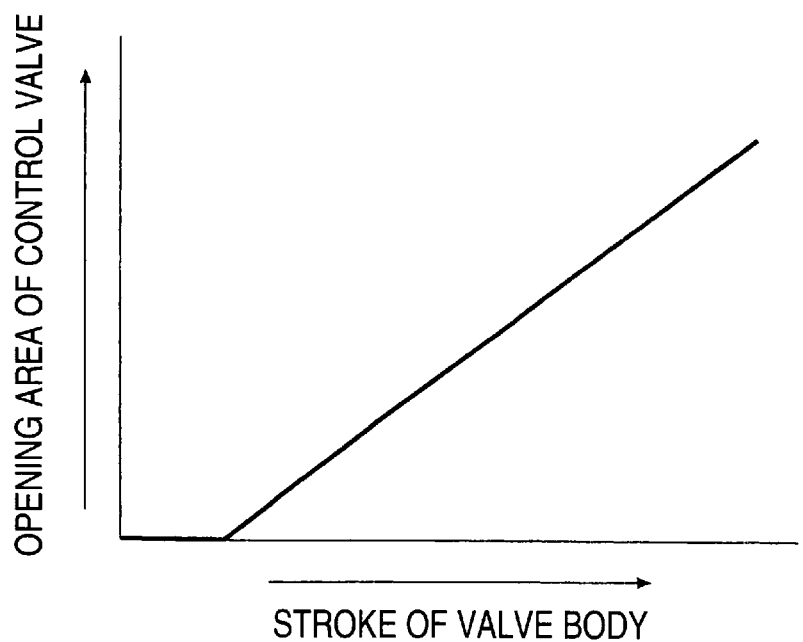
FIG. 7 is a diagram showing the characteristic of the control valve of the second embodiment.

Next, referring to FIGS. 6 and 7, a second embodiment of the invention will be described below.

The second embodiment is characterized by openings 38 . . . formed in the valve body 37 of the control valve 36, wherein the openings 38 . . . are circular holes disposed in the cylindrical portion 37a of the valve body 37 in such a manner as to follow a spiral path.

According to this second embodiment, the opening area of the control valve 36 is adapted to increase as the stroke of the valve body 37 increases. Moreover, a linearly proportional relationship continuously is maintained while the valve body 37 moves along the its stroke (refer to FIG. 7).

Figure 8:
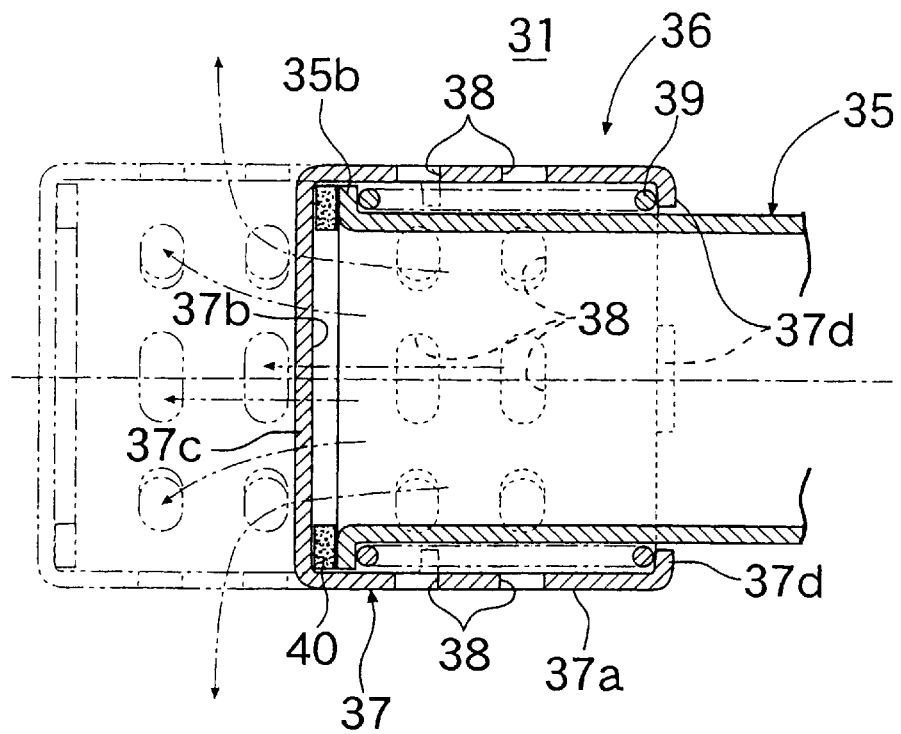
FIG. 8 is a longitudinal sectional view of a control valve according to a third embodiment of the invention.

Next, referring to FIGS. 8 and 9, a third embodiment of the invention will be described below.

The third embodiment is characterized by openings 38 formed in the valve body 37 of the control valve 36, wherein the openings 38 . . . are similar to those used in the first embodiment (refer to FIG. 3), but they are now formed in two rows.

Figure 9:
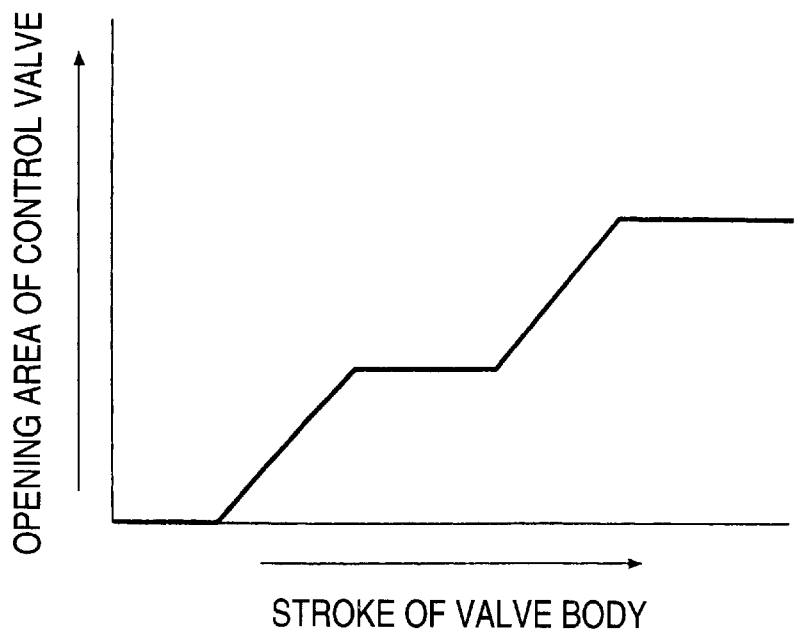
FIG. 9 is a diagram showing the characteristic of the control valve of the third embodiment.

According to this third embodiment, the opening area of the control valve 36 is adapted to increase in two stages as the valve body 37 moves along its stroke towards the valve's fully open position (refer to FIG. 9).

Figure 10:
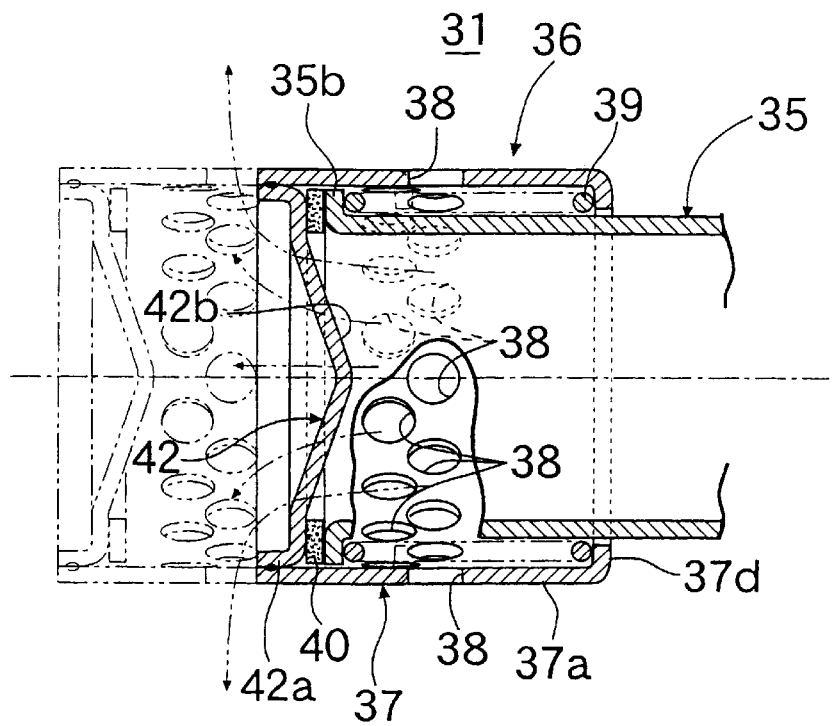
FIG. 10 is a longitudinal sectional view of a control valve according to a fourth embodiment of the invention.

Next, referring to FIGS. 10 and 11, a fourth embodiment of the invention will be described below.

This fourth embodiment is characterized by the construction of a valve body 37, wherein a cylindrical portion 37a has an annular flange 37d at a right end thereof and is open as wide as its diameter at a left end thereof. Then, a flange 42a having a circular bottom plate 42 is fitted in the opening at the left end of the cylindrical portion 37a, the flange 42a being constituted by a separate member which constitutes part of the valve body 37. The flange 42a so fitted in the cylindrical portion 37a is then fixed thereto by, for example, spot welding. A pressure receiving surface 42b is formed on a right side of the bottom plate 42 for receiving the pressure of exhaust gases. A coil spring 39 is disposed between the flange 35b of the second communicating pipe 35 and the flange 37d of the valve body 37 in a compressed state. A plurality of communicating holes 38 . . . which are disposed circumferentially at regular intervals, are formed in two rows in the cylindrical portion 37a of the valve body 37. Note that the bottom plate 42 can be spot welded in a state in which the flange 37d of the valve body 37 is pushed leftward so as to compress the coil spring 39.

Figure 11:
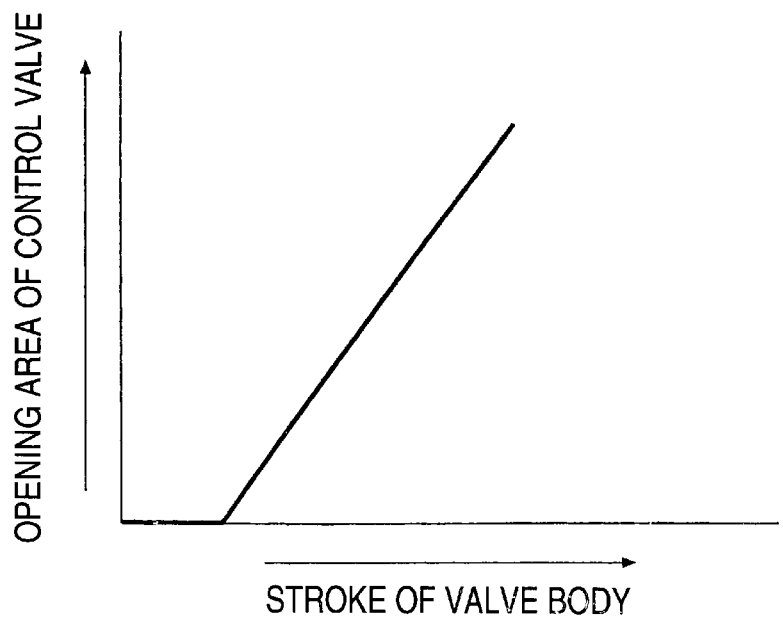
FIG. 11 is a diagram showing the characteristic of the control valve of the fourth embodiment.

Since the communicating holes 38 . . . in the first row and the communicating holes 38 . . . in the second row are disposed in a zigzag fashion such that they slightly overlap each other in an axial direction of the control valve 36, as shown in FIG. 11, the opening area of the control valve 36 increases linearly as the valve body 37 moves along its stroke toward the valve's fully open position. The reason why the increase gradient of the opening area of the control valve is steeper than the characteristic of the second embodiment as shown in FIG. 7 is because the communicating holes 38 . . . of this embodiment are formed over a relatively narrow axial extent, whereas the communicating holes 38 . . . of the second embodiment are formed over a relatively wide axial extent (refer to FIG. 6).

According to the fourth embodiment, the same operation and effective as in the first embodiment can be attained and, moreover, since the bottom plate 42 is constituted by the member separate from the cylindrical portion 37a of the valve body 37, the necessity of deep drawing the valve body 37 is obviated, this contributing to the reduction in production costs.

Figure 12:
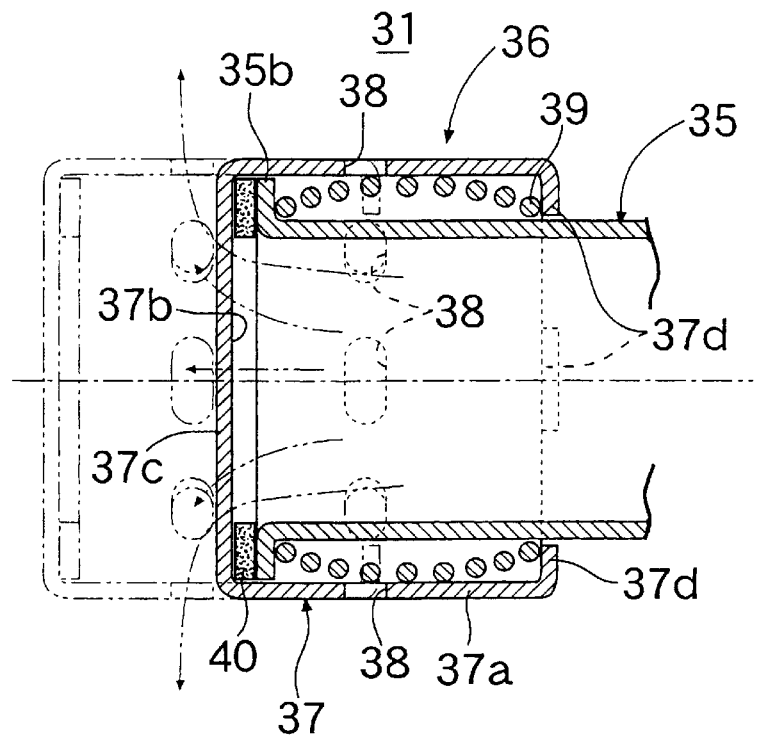
FIG. 12 is a longitudinal sectional view of a control valve according to a fifth embodiment of the invention.

Next, referring to FIG. 12, a fifth embodiment will be described below.

In this fifth embodiment, an improvement is made to the coil spring 39 of the first embodiment. In other words, while the coil spring 39 of the first embodiment is formed so as to have a constant diameter over its longitudinal length, a coil spring 39 according to the fifth embodiment is configured such that longitudinal ends of the coil spring 39 have a small diameter and are supported on the outer circumferential surface of the second communicating pipe 35, whereas a longitudinally central portion of the coil spring 39 has a larger diameter and is supported on the inner circumferential surface of the cylindrical portion 37a of the valve body 37. Therefore, on the whole, the coil spring 39 has a barrel-like shape.

According to the fifth embodiment, since the intermediate portion of the coil spring 39 has the larger diameter and comes into contact with the inner circumferential surface of the cylindrical portion 37a of the valve body 37, when the valve body 37 reciprocates axially relative to the second communicating pipe 35, there is generated a frictional force. This frictional force prevents vibration of the coil spring 39. Note that while the coil spring 39 is formed in this embodiment so as to have the smaller diameter at the ends thereof and to have the larger diameter at the intermediate portion thereof, such is merely exemplary. Of course, on the contrary, the coil spring may be formed such that it has a larger diameter at the ends thereof, and has a smaller diameter at the intermediate portion thereof.

Next, referring to FIGS. 13 to 14B, a sixth embodiment of the invention will be described below.

Although the control valve 36 is adapted to fit on the outer circumferential surface of the end portion of the second communicating pipe 35 in the first to fifth embodiments, in the sixth embodiment a valve body 37 is adapted to fit in an inner circumferential surface of the end portion of the second communicating pipe 35. Consequently, the annular flange 35b, at the left end of the second communicating pipe 35, is formed inwardly, whereas the annular flange 37d, at the right end of the valve body 37, is formed radially outwardly. The ends of the coil spring 39 are supported between these two flanges 35b, 37d so that the spring is in a compressed state, whereby the valve body 37 is biased rightward by the coil spring 39 (that is, in a direction in which the valve body 37 enters the interior of the second communicating pipe 35). Thus, in order to regulate a limit of the rightward movement of the valve body 37 so biased, an annular crimped portion 35c is formed by radially inwardly crimping the outer circumferential portion of the second communicating pipe 35. Also, a plurality of communicating holes 38 . . . are formed in the cylindrical portion 37a of the valve body 37 in such a manner as to be disposed circumferentially at regular intervals.

In order to form the crimped portion 35c on the outer circumferential portion of the second communicating pipe 35, as shown in FIG. 14A, the valve body 37 is inserted from the right-hand side into the second communicating pipe 35 in which the coil spring 39 is set in advance. Then, as shown in FIG. 14B, with the coil spring 39 being forced into the compressed state by pushing the valve body 37 leftward with a jig 43, the outer circumferential surface of the second communicating pipe 35 may be rolling crimped with a roller 44.

Figure 13:
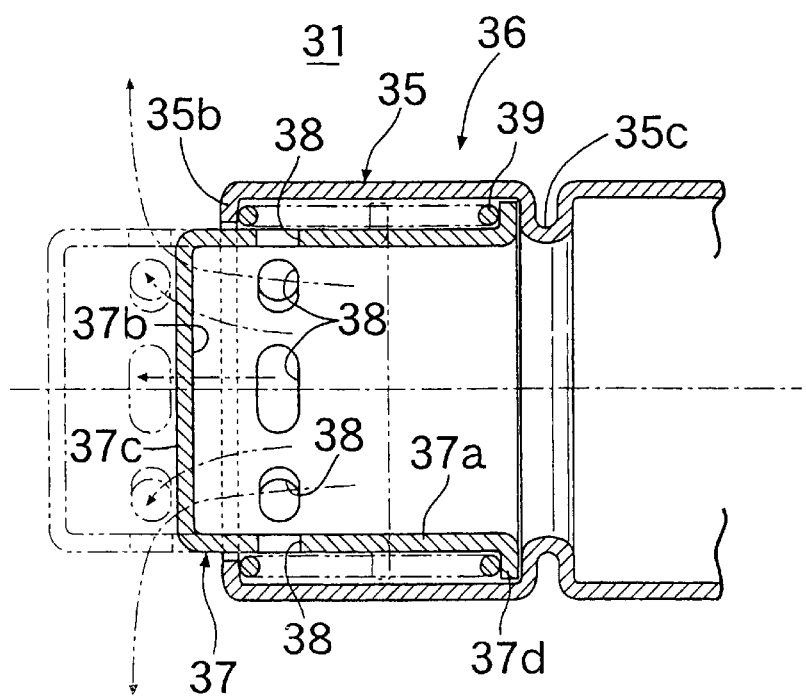
FIG. 13 is a longitudinal sectional view of a control valve according to a sixth embodiment of the invention.

According to this sixth embodiment, in a lower engine-loaded state in which the pressure of exhaust gases is low, since the pressure of exhaust gases acting on the pressure receiving surface 37b of the valve body 37 of the control valve 36 is small, the valve body 37 is retained at a valve closing position—shown by solid lines in FIG. 13—by virtue of the biasing force of the coil spring. Because the control valve 36 is closed, the flow resistance of the exhaust gases within the exhaust muffler M increases, whereby the exhaust gas noise silencing effect is enhanced, thereby making it possible to reduce the exhaust gas noise from the engine. Then, when the engine operating state changes to a higher engine-loaded state, since the pressure of exhaust gases acting on the pressure receiving surface 37b of the valve body 37 of the control valve 36 increases, the valve body 37 moves in a leftward direction—as viewed in FIG. 13—against the spring-back force of the coil spring 39. When the communicating holes 38 . . . move beyond the position of the flange 35b of the second communicating pipe 35, the control valve 36 opens, whereby the first silencing chamber 29 and the third silencing chamber 31 are caused to communicate with each other via the second communicating pipe 35. Additionally, since the opening area of the control valve 36 increases as the pressure of exhaust gases increases, the flow resistance of the exhaust gases within the exhaust muffler M is reduced when the engine is running with a higher load, thereby making it possible to minimize the reduction in engine output.

Thus, the same operation and effective as in the first embodiment can be attained even by this sixth embodiment.

Figure 15:
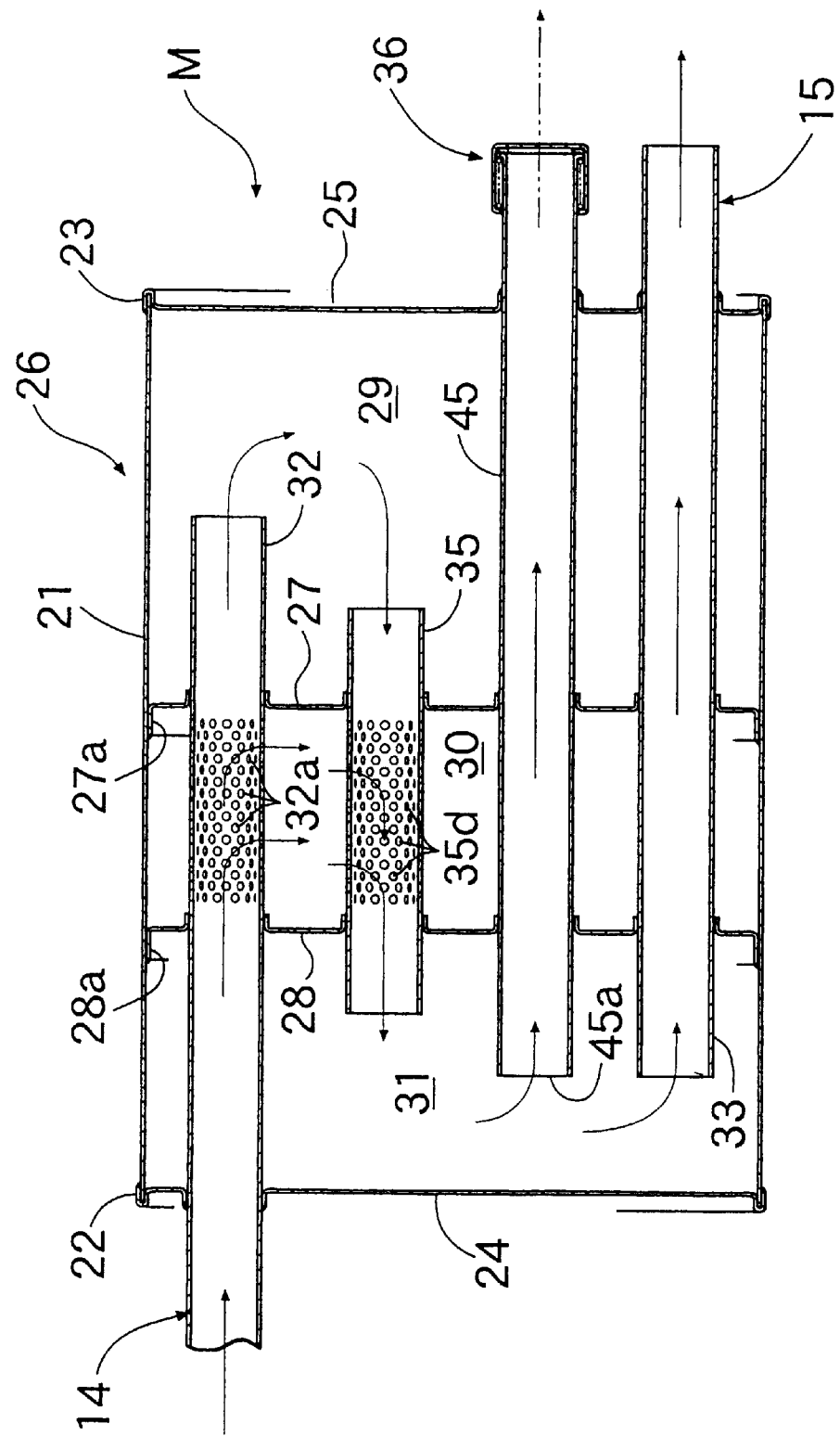
FIG. 15 is a longitudinal sectional view, corresponding to FIG. 2, of an exhaust muffler according to a seventh embodiment of the invention.

Next, referring to FIG. 15, a seventh embodiment of the invention will be described below.

Although the control valve 36 was provided on the downstream end of the second communicating pipe 35 provided within the exhaust muffler M in the first to sixth embodiments, in this seventh embodiment the second communicating pipe 35 is not provided with the control valve 36 but, instead, a number of holes 35d are punched out in a portion of the second communicating pipe 35, which portion faces the second silencing chamber 30. Then, a control valve 36 is provided at a downstream end of a sub-exhaust gas discharge pipe 45 that passes through the first baffle plate 27, the second baffle plate 28 and the rear end plate 25 to extend outwardly of the muffler main body 26. The construction of the control valve 36 may be of any of the constructions described in the first to sixth embodiments.

Even in this seventh embodiment, the control valve 36 is retained at the valve closing position in the lower engine-loaded state in which the pressure of exhaust gases is low, whereby the exhaust gas noise silencing effect is enhanced to thereby reduce exhaust gas noise. On the other hand, in the higher engine-loaded state in which the pressure of exhaust gases is high, the opening area of the control valve 36 increases, in response to the pressure of exhaust gases from an exhaust gas inlet opening 45a of the sub-exhaust gas discharge pipe 45, whereby the flow resistance of the exhaust gases in the exhaust muffler M is reduced to thereby minimize the reduction in engine power output.

Thus, while the embodiments of the invention have been described in detail heretofore, the design of the invention may be variously modified without departing from the sprit of the invention.

For example, while the second communicating pipe 35 and the sub-exhaust gas discharge pipe 45 are illustrated as the first tubular body in the above-described embodiments, the first aspect of the invention may involve mounting the control valve 36 on portions of the baffle plates where there exists no communicating pipe.

Additionally, the shape, number, location and the like of the openings or communicating holes 38 . . . in the valve body 37 may be modified as required.

Furthermore, while the coil spring 39 is used to bias the valve body 37 in the above-described embodiments, a spring in any other form may be used instead.

Still further, although the front exhaust pipe 14 and the exhaust gas induction pipe 32 are formed integrally in the embodiments, they may be constituted by separate members for connection. Similarly, while the rear exhaust pipe 15 and the exhaust gas discharge pipe 33 are formed integrally in the embodiments, they may be constituted by separate members for connection.

Moreover, the numbers of silencing chambers and communicating pipes may be modified as required.

According to the first aspect of the invention, since the control valve can be constituted by only three members—such as the first tubular body, the second tubular body and the spring—the size, weight and production cost of the control valve can be reduced. Additionally, since the first and second tubular bodies are disposed to radially overlap with each other, the axial dimension of the control valve can be reduced to thereby save and reduce the space required for installation thereof.

According to the second aspect of the invention, since the communicating pipe for communicating between the plurality of silencing chambers, or the exhaust gas discharge pipe, is used as the first tubular body, the number of components can be reduced to thereby reduce further the size, weight and production cost of the control valve.

According to the third aspect of the invention, since the spring is constituted by a compression coil spring whose outside diameter is variable relative to the axial direction thereof, whereby the spring is adapted to come into contact with at least one of the first and second tubular bodies at the outer or inner circumferential portions thereof, the resonance phenomenon of the spring can be prevented by virtue of a friction force acting on the contact portion.

According to the fourth aspect of the invention, since the flow rate of the exhaust gases passing through the control valve increases gradually, or in a stepped fashion, as the engine load increases, the target ratio between the exhaust gas noise silencing effect and the engine output reduction suppressing effect can be controlled gradually or in a stepped fashion from a lower engine-loaded state in which priority is given to the improvement in the exhaust gas noise silencing effect, to a higher engine-loaded state in which priority is given to the improvement in the engine output reduction suppressing effect. Therefore, the ratio between the two effects can be automatically varied, as the driver expects, in response to a change in engine load, thereby making it possible to enhance the performance of the exhaust muffler.

What is claimed is:

1. An exhaust muffler, comprising:

a muffler main body;

an exhaust gas induction pipe for inducting exhaust gases into said muffler main body;

an exhaust gas discharge pipe for discharging the exhaust gases within said muffler main body to the outside; and a control valve provided within said muffler main body or on said exhaust gas discharge pipe, for controlling the flow of the exhaust gases, said control valve comprising:

a first tubular body having an exhaust gas inlet opening, at one side thereof, through which exhaust gases flow in an axial direction from said one side toward a second, opposite, side of said first tubular body;

a second tubular body being fitted to said first tubular body to be movable in the axial direction and having a pressure receiving surface for receiving the pressure of exhaust gases flowing thereinto from said exhaust gas inlet opening, wherein said pressure receiving surface is located at said second side of said first tubular body; and a spring disposed in an annular gap formed between an outer circumferential surface of said first tubular body and an inner circumferential surface of said second tubular body, at a portion where said first tubular body is fitted to said second tubular body, for axially biasing said second tubular body towards said one side of said first tubular body, said second tubular body defining at least one communication hole in a circumferential surface thereof so that the exhaust gases within said first tubular body flow out of said at least one communicating hole to the outside of said second tubular body, when said second tubular body receives the pressure of the exhaust gases at said pressure receiving surface and axially moves towards the second side against the biasing force of said spring.

2. The exhaust muffler according to claim 1, wherein said first tubular body is constituted by one of a communicating pipe for communicating between a plurality of silencing chambers formed by partitioning the interior of said muffler main body, and said exhaust gas discharge pipe.

3. An exhaust muffler, comprising:

a muffler main body;

an exhaust gas induction pipe for inducting exhaust gases into said muffler main body;

an exhaust gas discharge pipe for discharging the exhaust gases within said muffler main body to the outside; and a control valve provided within said muffler main body or on said exhaust gas discharge pipe, for controlling the flow of the exhaust gases, said control valve comprising:

a first tubular body having an exhaust gas inlet opening, at one side thereof, through which exhaust gases flow in an axial direction from said one side toward a second, opposite, side of said first tubular body;

a second tubular body being fitted to said first tubular body to be movable in the axial direction and having a pressure receiving surface for receiving the pressure of exhaust gases flowing thereinto from said exhaust gas inlet opening, wherein said pressure receiving surface is located at said second side of said first tubular body; and a spring disposed in an annular gap formed between said first and second tubular bodies, at a portion where said first tubular body is fitted to said second tubular body, for axially biasing said second tubular body towards said one side of said first tubular body, said second tubular body defining at least one communication hole in a circumferential surface thereof so that the exhaust gases within said first tubular body flow out of said at least one communicating hole to the outside of said second tubular body, when said second tubular body receives the pressure of the exhaust gases at said pressure receiving surface and axially moves towards the second side against the biasing force of said spring, wherein said spring is constituted by a compression coil spring whose outside diameter is variable relative to an axial direction thereof so that said spring is brought into contact with at least one of said first and second tubular bodies in at least one of outer and inner circumferential portions thereof.

4. The exhaust muffler according to claim 1, wherein as the amount of axial movement of said second tubular body towards said second end increases, the opening area of said at least one communicating hole increases.

5. An exhaust muffler, comprising:

a muffler main body;

an exhaust gas induction pipe for inducting exhaust gases into said muffler main body;

an exhaust gas discharge pipe for discharging the exhaust gases within said muffler main body to the outside; and a control valve provided within said muffler main body or on said exhaust gas discharge pipe, for controlling the flow of the exhaust gases, said control valve comprising:

a first tubular body having an exhaust gas inlet opening, at one side thereof, through which exhaust gases flow in an axial direction from said one side toward a second, opposite, side of said first tubular body;

a second tubular body being fitted to said first tubular body to be movable in the axial direction and having a pressure receiving surface for receiving the pressure of exhaust gases flowing thereinto from said exhaust gas inlet opening, wherein said pressure receiving surface is located at said second side of said first tubular body; and a spring disposed in an annular gap formed between said first and second tubular bodies, at a portion where said first tubular body is fitted to said second tubular body, for axially biasing said second tubular body towards said one side of said first tubular body, said second tubular body defining at least one communication hole in a circumferential surface thereof so that the exhaust gases within said first tubular body flow out of said at least one communicating hole to the outside of said second tubular body, when said second tubular body receives the pressure of the exhaust gases at said pressure receiving surface and axially moves towards the second side against the biasing force of said spring, wherein said control valve further comprises an annular shock absorbing member disposed between said pressure receiving surface of said second tubular body and an end at said second side of said first tubular body.

* * * * *